United States Patent [19]

Smith

[11] 4,332,398
[45] Jun. 1, 1982

[54] INFLATABLE RESTRAINT SYSTEM

[75] Inventor: George R. Smith, Bloomfield Hills, Mich.

[73] Assignee: General Motors Corporation, Detroit, Mich.

[21] Appl. No.: 167,410

[22] Filed: Jul. 11, 1980

[51] Int. Cl.³ .............................................. B60R 21/08
[52] U.S. Cl. .................................... 280/732; 280/740
[58] Field of Search ............... 280/730, 732, 736, 742, 280/740, 741

[56] References Cited

U.S. PATENT DOCUMENTS

| 2,755,125 | 7/1956 | Hodges | 280/732 X |
| 3,817,552 | 6/1974 | Knight et al. | 280/740 X |
| 3,910,595 | 10/1975 | Katter et al. | 280/732 |
| 3,930,664 | 1/1976 | Parr et al. | 280/732 |

Primary Examiner—Joseph F. Peters, Jr.
Assistant Examiner—Michael Mar
Attorney, Agent, or Firm—Edward J. Biskup

[57] ABSTRACT

An inflatable restraint system having a gas flow-control device that houses an inflator-diffuser combination and that is formed with an elongated horizontally orientated nozzle combined with a pair of retarder members for providing a controlled deployment of the restraint cushion.

3 Claims, 6 Drawing Figures

INFLATABLE RESTRAINT SYSTEM

This invention relates to an inflatable restraint system for use in a motor vehicle for restraining forward movement of a seated occupant during conditions of sudden impact or collision.

More specifically, the present invention is directed to an inflatable restraint system that includes a housing adapted to be mounted to the instrument panel of a motor vehicle opposite the passenger's seat. The housing has an inflator-diffuser combination mounted therein and is formed with an elongated horizontally orientated slot facing the passenger's seat. Upper and lower flaps are mounted in the interior of the housing to the rear of the slot and define a narrow elongated opening which registers with the slot. A flow-control device, which is tear-drop shaped in cross section, encloses the inflator-diffuser combination and is formed with an elongated horizontally orientated nozzle which extends through the flaps and terminates within the slot. A restraint cushion made of a flexible woven fabric encloses the flow-control device, with a major portion of the restraint cushion being stored to the rear of the flaps between the flow-control device and the housing. The arrangement is such that the upper and lower flaps maintain a portion of the restraint cushion in engagement with the flow-control device adjacent the nozzle so that during inflation of the restraint cushion the cushion is gradually released from the housing to cause the deploying portion of the cushion to be under continuous tension.

The objects of the present invention are: to provide a new and improved inflatable restraint system which includes a support housing for storing a restraint cushion therein and includes means for permitting gradual release of the restraint cushion from the support housing during inflation of the restraint cushion; to provide a new and improved inflatable restraint system which has a flow-control device that houses an inflator-diffuser combination and that is formed with an elongated horizontally orientated nozzle that is combined with a pair of retarder members for providing controlled deployment of the restraint cushion; and to provide a new and improved inflatable restraint system which maintains the restraint cushion under continuous tension during deployment by exerting a retarding force on the restraint cushion as the latter moves out of the housing in which it is stored.

Other features and advantages of the present invention will be apparent from the following detailed description when taken in conjunction with the accompanying drawings, in which.

Figure 1:
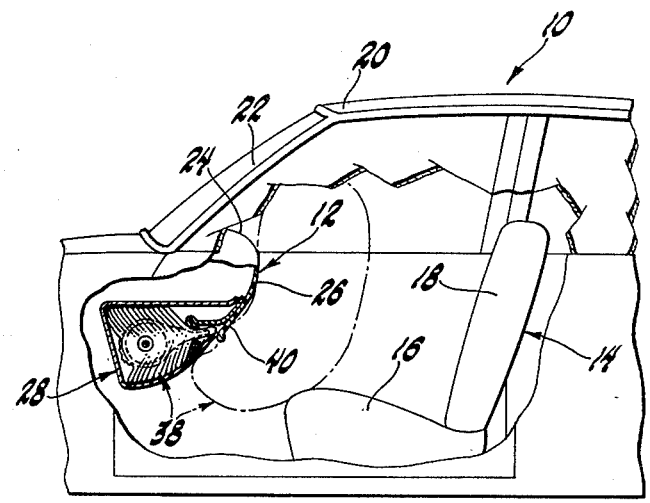
FIG. 1 is a view of a motor vehicle having an inflatable restraint system made in accordance with the invention which is housed within the lower portion of the vehicle instrument panel.

Referring to the drawings and more particularly to FIG. 1 thereof, a motor vehicle 10 is schematically shown as including an instrument panel 12 positioned forwardly of a passenger seat 14 consisting of a seat cushion 16 and a seat back 18. The front portion of the roof 20 of the motor vehicle 10 is attached to the usual windshield 22 that extends forwardly and terminates at the instrument panel 12 which includes an upper surface 24 facing the windshield 22 and a frontal surface 26 facing the passenger seat 14. Mounted to the lower portion of the instrument panel 12 is an inflatable restraint system 28 made in accordance with the present invention. The inflatable restraint system 28 comprises a support housing 30, a flow-control device 32, an inflator 34 located within a diffuser 36, and a restraint cushion 38. A cover 40 made of a resilient material normally closes the front portion of the housing 30 and is adapted to swing upwardly upon deployment of the restraint cushion 38, as will be more fully explained hereinafter.

As is conventional, suitable sensor means (not shown) furnishes a signal under predetermined conditions and causes the inflator 34 to be activated to inflate the restraint cushion 38. When the restraint cushion 38 is fully inflated, it assumes the configuration shown in the phantom lines of FIG. 1 to cover the instrument panel 12 and windshield 22 so as to provide a restraint limiting the forward movement of a seated occupant.

Figure 2:
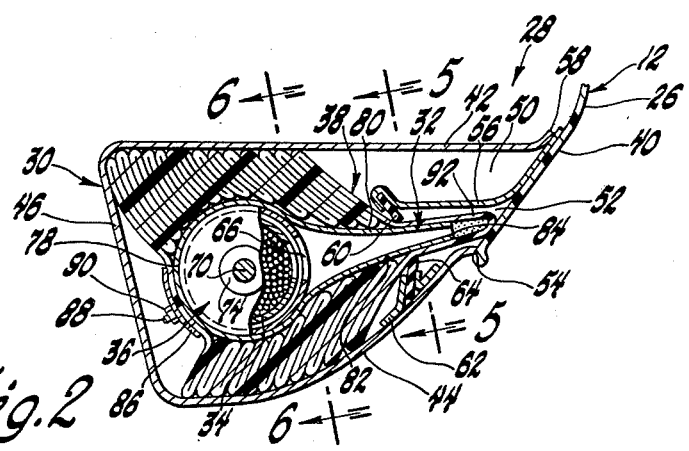
FIG. 2 is an enlarged side elevational view of the inflatable restraint system shown in FIG. 1, with the one side wall removed to reveal the detailed parts of the system.
Figure 3:
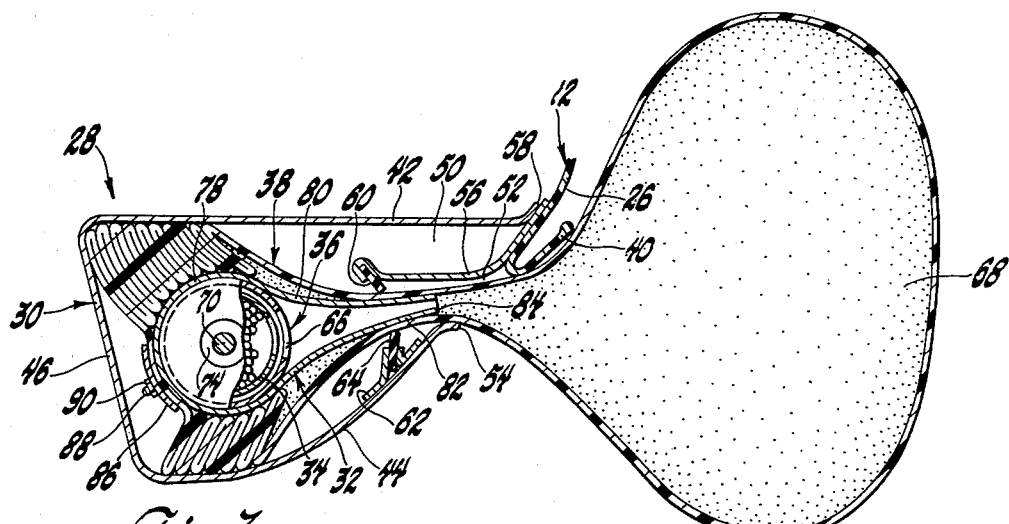
FIG. 3 shows the restraint cushion incorporated with the inflatable restraint system of FIGS. 1 and 2, in the partially-deployed position.
Figure 5:
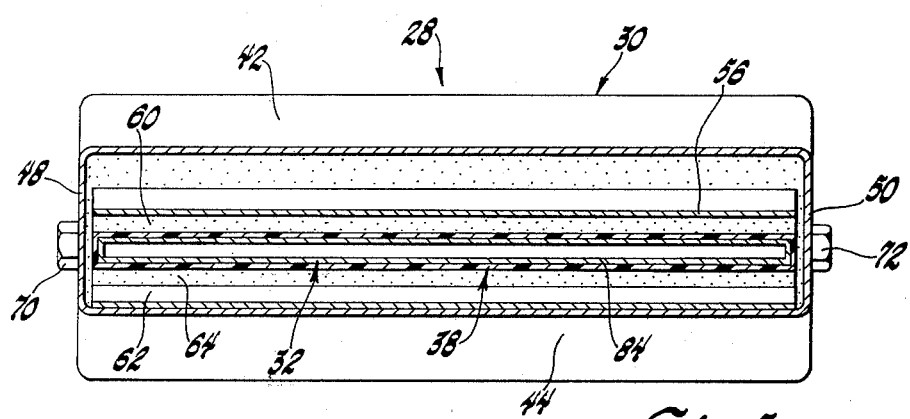
FIG. 5 is a sectional view taken on line 5—5 of FIG. 2.

More specifically, and with reference to FIGS. 2 and 5, the housing 30 comprises a generally flat top wall 42 and a curved bottom wall 44, both of which are interconnected by a back wall 46. A pair of side walls 48 and 50 interconnect the top wall 42, bottom wall 44, and back wall 46 and form a substantially closed compartment-except for an elongated horizontally orientated rectangular opening 52 located in the frontal portion of the housing 30. In this regard it will be noted that the front edge 54 of the bottom wall 44 cooperates with a curved plate 56 attached to the front end 58 of the top wall 42 for defining the opening 52. The plate 56 extends the full length of the housing 30 and rigidly supports a retarder member or flap 60 which is made of a flexible material, such as rubber. Similarly, the bottom wall 44 has a suitable bracket 62 attached thereto which supports a retarder member or flap 64 that is identical to the flap 60 mounted to the top wall 42. Although not shown, it will be understood that each of the flaps 60 and 64 extends the full length of the housing 30. Moreover, the opening 52 is normally closed by the cover 40 which assumes the position shown in FIG. 2 prior to inflation of the restraint cushion 38.

Figure 6:
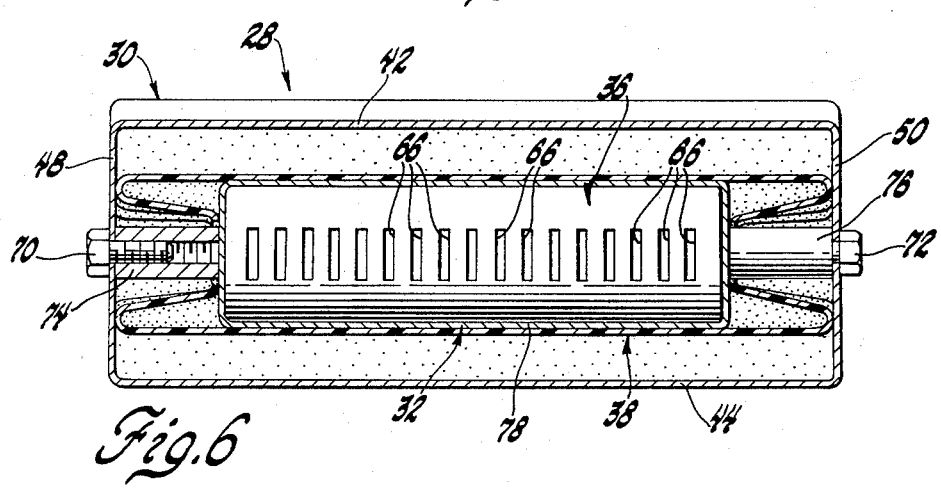
FIG. 6 is a sectional view taken on line 6—6 of FIG. 2.

As seen in FIG. 2, the inflator 34 is cylindrical in configuration and serves as a chemical gas generator which produces the inflating energy upon activation by an electrical signal. Thus, upon signal from a crashsensing system (not shown), the inflator 34 is activated and the gas is directed through the diffuser 36 into the restraint cushion 38. As best seen in FIG. 6, the diffuser 36 is formed with the usual axially spaced openings 66 appropriately located and sized so as to provide proper distribution of the gas into the compartment area 68 of the restraint cushion 38. In addition, it will be noted that the inflator 34 and diffuser 36 are connected as a combined unit to the side walls 48 and 50 of the housing 30 by a pair of bolts 70 and 72 which extend into tapped bosses 74 and 76, respectively, rigid with the combined unit.

The flow-control device 32 is generally tear-drop shaped in cross section and extends the full length of the housing 30. The flow-control device 32 is formed with a cylindrical section 78 which houses and is rigidly connected to the diffuser 36. The cylindrical section 78 is integrally connected to a pair of rearwardly projecting curved sections 80 and 82 which converge and form a nozzle 84 that extends between the flap members 60 and 64 and terminates within the opening 52 formed in the housing 30. The nozzle 84 is coextensive with the diffuser 36 and is positioned slightly forwardly of the cover 40.

Figure 4:
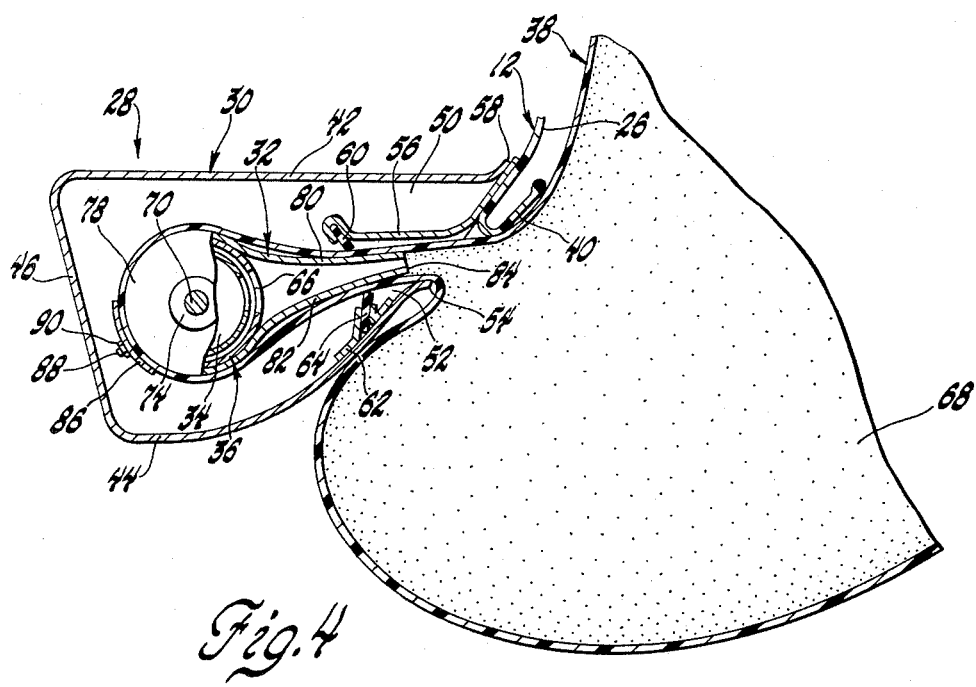
FIG. 4 shows the restraint cushion in the fully-deployed position.

The flow-control device 32, as well as the inflator 34 and the diffuser 36, are located within the confines of the restraint cushion 38. In this regard, it will be noted that the restraint cushion 38 is made of a porous Nylon fabric and, as seen in FIG. 2, a portion of the restraint cushion 38 is secured to the cylindrical section 78 of the flow-control device 32 by a curved support plate 86 having longitudinally aligned apertures (not shown) each of which receives a threaded stud, such as indicated by the reference numeral 88. A nut 90 is threaded on each stud 88 to maintain the support plate 86 in position and thereby securely hold a portion of the restraint cushion 38 on the cylindrical section 78 of the flow-control device 32. It will also be noted that the flow-control device 32 is centrally positioned within the housing 30 so as to provide sufficient space for storing the restraint cushion 38 within the housing 30. Accordingly, when the restraint cushion 38 is in the stored condition shown in FIG. 2, the flaps 60 and 64 serve to press the the fabric of the restraint cushion 38 against the outer surface of the curved sections 80 and 82 of the flow-control device 32. As a result, when the inflator 34 is activated, the gas flows through the nozzle 84 and acts only against a small portion 92 of the total restraint cushion 38, as seen in FIG. 2. This small portion 92 will then be completely filled and cause the cover 40 to move outwardly as this position 92 of the restraint cushion 38 begins to fill. The flaps 60 and 64, acting against the fabric of the restraint cushion 38, prevent any backward flow of gases into the remaining portion of the restraint cushion 38. As the inflator 34 continues to supply pressurized gas to the compartment area 68 of the restraint cushion 38, the restraint cushion 38 continues to fill until it is completely deployed, as seen in FIGS. 1 and 4. Because the flaps 60 and 64 retard the release of the restraint cushion 38 from the housing 30, the fabric of the deployed portion of the restraint cushion 38 is maintained under continuous tension throughout the entire inflation period. Thus, if an occupant is close to the instrument panel 12 at the time of collision, the restraint cushion 38 will facilitate moving the occupant rearwardly toward the passenger seat 14 and at the same time will provide a cushion which absorbs occupant impact and minimizes rebound.

Various changes and modifications can be made in this construction without departing from the spirit of the invention. Such changes and modifications are contemplated by the inventor, and he does not wish to be limited except by the scope of the appended claims.

The embodiments of the invention for which an exclusive property or privilege is claimed are defined as follows:

1. An inflatable restraint system for a motor vehicle comprising, in combination: a support housing adapted to be fixedly secured to said motor vehicle; a diffuser mounted in said support housing and having a plurality of slots formed therein; an inflator positioned in said diffuser for providing a pressurized gas which is adapted to flow through said slots in said diffuser; and opening formed in said support housing; a pair of retarder members mounted in said support housing adjacent said opening; a flow-control device for receiving said gas flowing through said slots in said diffuser and having a body portion terminating with an elongated nozzle which extends between said pair of retarder members and registers with said opening; and a restraint cushion made of a flexible material enclosing said diffuser and said flow-control device, with a major portion of said restraint cushion being folded to one side of said pair of retarder members and with portions of said restraint cushion being pressed into engagement with said body portion of said flow-control device by said pair of retarder members so that initially the gas flow emanating from said diffuser during inflation is directed by said nozzle against a small portion of the total restraint cushion and thereby causes said major portion of said restraint cushion to be gradually deployed through said opening in said support housing.

2. An inflatable restraint system for a motor vehicle comprising, in combination: a support housing adapted to be fixedly secured to said motor vehicle; a diffuser mounted in said support housing and having a plurality of slots formed therein; an inflator positioned in said diffuser for providing a pressurized gas which is adapted to flow through said slots in said diffuser; an elongated, horizontally orientated opening formed in said support housing; a pair of elongated, horizontally orientated retarder members mounted in said support housing adjacent said opening; a flow-control device for receiving said gas flowing through said slots in said diffuser and having a body portion terminating with an elongated nozzle which extends between said pair of retarder members and registers with said opening; and a restraint cushion made of a flexible material enclosing said diffuser and said flow-control device, with a major portion of said restraint cushion being folded to one side of said pair of retarder members and with portions of said restraint cushion being pressed into engagement with said body portion of said flow-control device by said pair of retarder members so that initially the gas flow emanating from said diffuser during inflation is directed by said nozzle against a small portion of the total restraint cushion and thereby causes said major portion of said restraint cushion to be gradually deployed through said opening in said support housing.

3. An inflatable restraint system for the instrument panel of a motor vehicle comprising, in combination: a support housing adapted to be fixedly secured to said instrument panel; a diffuser mounted in said support housing and having a plurality of slots formed therein; an inflator positioned in said diffuser for providing a pressurized gas which is adapted to flow through said slots in said diffuser; an elongated opening formed in said support housing; a cover normally closing said opening and adapted to swing to an open position; upper and lower elongated retarder members made of an elastomeric material and mounted in said support housing adjacent said opening; a flow-control device for receiving the gas flowing through said slots in said diffuser and having a body portion terminating with an elongated nozzle which extends between said upper and lower retarder members and registers with said opening; and a restraint cushion made of a flexible material enclosing said diffuser and said flow-control device, with portions of said restraint cushion being pressed into engagement with said body portion of said flow-control device adjacent said nozzle by said upper and lower retarder members so that the gas flow emanating from said diffuser during inflation is directed by said nozzle against said restraint cushion and said restraint cushion is gradually deployed through said opening in said support housing.

* * * * *